United States Patent

Spacil

[15] 3,635,812
[45] Jan. 18, 1972

[54] SOLID OXYGEN-ION ELECTROLYTE CELL FOR THE DISSOCIATION OF STEAM

[72] Inventor: Henry S. Spacil, Schenectady, N.Y.
[73] Assignee: General Electric Company
[22] Filed: July 5, 1968
[21] Appl. No.: 742,653

[52] U.S. Cl. .................................. 204/193, 204/128
[51] Int. Cl. .................... B01k 1/00, B01k 3/04, B01k 3/06
[58] Field of Search ............... 204/130, 129, 1.1, 195, 193, 204/1 T; 136/86

[56] References Cited

UNITED STATES PATENTS

| | | |
|---|---|---|
| 3,400,054 | 9/1968 | Ruka et al. .................. 204/1 T |
| 3,503,809 | 3/1970 | Spacil ........................ 136/86 F |
| 3,497,312 | 2/1970 | Zeff et al. ................... 204/129 |
| 3,471,384 | 10/1969 | Albertson ................... 204/129 |
| 3,451,911 | 6/1969 | Tannenberger et al. .... 136/86 |
| 3,402,230 | 9/1968 | White, Jr. ................... 136/86 |

Primary Examiner—John H. Mack
Assistant Examiner—R. L. Andrews
Attorney—Richard R. Brainard, Paul A. Frank, Charles T. Watts, Leo I. Ma Lossi, Frank L. Neuhauser, Oscar B. Waddell and Melvin M. Goldenberg

[57] ABSTRACT

The dissociation of water vapor primarily for the generation of hydrogen gas by the use of a solid oxygen-ion electrolyte cell is described. In the preferred arrangement means for supplying a flow of reducing gas to the anode is employed to depolarize the anode.

4 Claims, 1 Drawing Figure

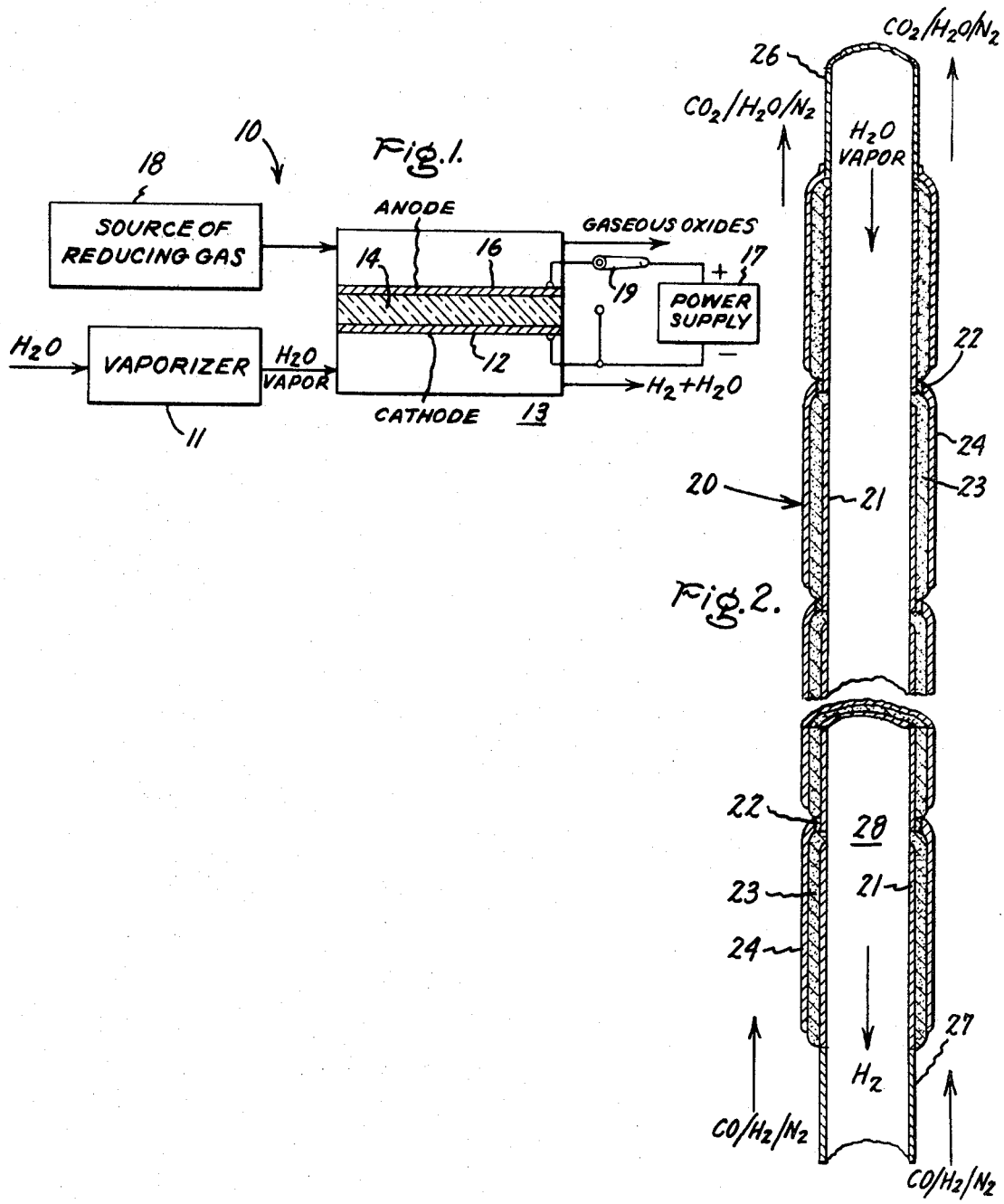

3,635,812

SOLID OXYGEN-ION ELECTROLYTE CELL FOR THE DISSOCIATION OF STEAM

BACKGROUND OF THE INVENTION

The decomposition of liquid water into hydrogen and oxygen gas by electrolysis is broadly old.

Solid oxygen-ion electrolyte fuel cell structures for operation at elevated temperatures are also broadly old. Such fuel cells employ in combination a solid oxygen-ion electrolyte layer having electrodes at opposite faces thereof, fuel and oxygen supplies in communication with the respective electrodes and electrical leads connected to the respective electrodes.

SUch fuel cell structures have been used to generate low voltage direct current power and as oxygen sensors. Also, when operated in reverse (electrical power supplied to the electrodes) such a construction will function as an oxygen pump or oxygen concentrator.

The construction of an exemplary solid oxygen-ion electrolyte cell for the practice of this invention will be characterized in detail in the description to follow; however, in general, a cell stack construction substantially in accordance with the disclosure in application Ser. No. 465,624—white (now U.S. Pat. No. 3,402,230), filed June 21, 1965 is preferred. Various electrode and electrolyte constructions for use in such a cell stack, or in individual cell constructions, are described in the following patent applications: Ser. No. 645,288—Mitoff (now U.S. Pat. No. 3,533,849), filed June 12, 1967; Ser. No. 680,245—Spacil (now U.S. Pat. No. 3,503,809), filed Nov. 2, 1967 and Ser. No. 645,423—Tedmon et al., filed June 12, 1967. All of the above-mentioned patent applications are assigned to the assignee of the instant invention and all are incorporated by reference herein.

Although the preferred oxygen-ion material for the practice of this invention is solid stabilized zirconia, other solid oxygen-ion materials, such as ceria-doped lanthanum oxide, which is an oxygen-ion electrolyte described in an article by Takahashi, Ito and Iwahara in Denki Kagaku, 34, 205–209 (1966) are satisfactory.

Zirconia may be purchased commercially either already stabilized or in a relatively pure state for stabilization (conversion from monoclinic zirconia to cubic zirconia) by the user. Typical analyses of the prestabilized and unstabilized zirconias used in the practice of this invention are set forth below:

| Prestabilized | | Unstabilized | |
|---|---|---|---|
| $ZrO_2$* | 93.94 | $ZrO_2$* | 99.08 |
| $SiO_2$ | 0.62 | $SiO_2$ | 0.18 |
| $Fe_2O_3$ | 0.10 | CaO | 0.22 |
| $TiO_2$ | 0.11 | MgO | 0.15 |
| CaO | 4.80 | $Fe_2O_3$ | 0.10 |
| MgO | 0.25 | $Al_2O_3$ | 0.16 |
| $Al_2O_3$ | 0.18 | $TiO_2$ | 0.11 |
| | 100.00 | | 100.00 |

*traces of $HfO_2$

Solid stabilized zirconia is a compound with a cubic crystal structure consisting of zirconia to which has been added calcium oxide, magnesium oxide, yttrium oxide, ytterbium oxide, or a mixture of rare earth oxides. For example, a preferred solid zirconia member employed as an electrolyte is stabilized with 11 molecular percent calcium oxide. Other stabilized zirconias which may also be employed as solid electrolytes are discussed in "Oxide Ceramics" by Ryshkewitch, Academic Press, 1960, particularly on pages 354, 364 and 376 thereof.

There has been a continuing need for means for the preparation of less expensive hydrogen gas for use in many chemical processes. The instant invention not only eliminates dissolved impurities from the region of dissociation of the water, but also enables the conduct of such dissociation with substantially reduced electrical power requirements.

SUMMARY OF THE INVENTION

The instant invention is directed to the employment in combination of means to vaporize water, means to conduct the vaporized product to the cathode of a solid oxygen-ion electrolyte cell, and means for supplying electrical power to the cell both to effect dissociation of the water vapor (steam) and to heat the cell to operating temperature whereby oxygen from the water vapor is removed through the solid oxygen-ion electrolyte in the form of oxygen ions. In the preferred construction means are employed for supplying a reducing gas to the anode of the solid oxygen-ion electrolyte cell to bring about depolarization thereof.

BRIEF DESCRIPTION OF THE DRAWING

The exact nature of this invention as well as objects and advantages thereof will be readily apparent from consideration of the following specification relating to the annexed drawing in which:

FIG. 1 is a flow diagram showing the relationship between several pieces of apparatus required for the generation of hydrogen gas in the manner of this invention and FIG. 2 is an enlarged view shown in cross section of a stack of solid electrolyte cells as may be employed in the generation of hydrogen displaying a preferred gaseous flow.

DESCRIPTION OF THE PREFERRED EMBODIMENT

The generation of hydrogen in the apparatus 10 of this invention involves the phenomenon of dissociation, rather than electrolysis, because there are no ions present in solution as would be the case in electrolysis.

Water is converted to steam in vaporizer 11 and the vaporized water is then brought into contact with cathode 12 of the solid oxygen-ion electrolyte cell 13, which is heated to operating temperature (preferably in excess of 800° C.) by any convenient means such as a combination of electrical resistance heating or combustion of a fuel plus the Joulean heating of the cell electrolyte 14 itself due to the passage of the dissociating current therethrough from anode 16 to cathode 12. Direct current power from power supply 17 is applied as shown with the path of electrons flowing from the power supply to cathode 12 and from anode 16 back to the power supply 17.

At cathode 12, the water vapor is dissociated into hydrogen and oxygen and each atom of oxygen from the water molecules accept two electrons each to become an oxygen-ion. Each oxygen-ion thus formed is then transported across solid oxygen-ion electrolyte layer 14 to anode 16. At anode 16, the oxygen-ions release electrons, which return to power supply 17 making oxygen atoms available at anode 16. This is clearly a non-liquid electrolytic mechanism.

A reducing gas or mixture of reducing gases, for example, $CO/H_2$ mixture, either flows under pressure or is pumped from source 18 into contact with anode 16 whereby these gases combine with the oxygen evolved at the anode. The $CO/H_2$ mixture may be produced, for example, by the partial oxidation of a hydrocarbon fuel.

If oxygen gas is a desired byproduct, the reducing gas inflow would not be employed. However, by supplying reducing gas to the anodic electrode 16 the open circuit voltage (encountered in the absence of this gas) of the solid oxygen-ion electrolyte cell (0.8 to 1.1 volts) is reduced by an amount in the order of from 0.6 to 1.2 volts assuming that enough reducing gas is provided to combine with all of the oxygen evolved at anode 16. This behavior is referred to as "depolarization." The electrical power required for the dissociation of water vapor is reduced sharply since this power must be supplied at a potential at least as high as the open circuit cell voltage.

If an excess of reducing gas is supplied to the anode, relative to the flow of water vapor to the cathode, the open circuit voltage of the cell will be negative. Under these conditions the system does not require power input and power supply 17 is not used, the electrodes being simply connected by an electrical conductor thereby allowing electron flow through the conductor from the anode to the cathode. The cell is then self-driven. Switch 19 provides for optional operation in this manner. Such a conductor for a self-driven cell can consist of electrode leads as already described, or may consist of any suitable conducting path located internal to the cell.

Following oxidation at the anode any unoxidized CO and $H_2$ remaining in the outgoing flow of reducing gas may be burned, if desired, to preheat the input gases to either the cathodic or anodic electrodes. Thus, the instant invention contemplates either a) the use of electrical energy only to dissociate water vapor in a high temperature solid oxygen-ion electrolyte cell, b) to use the combination of electrical energy and the chemical energy of a reducing gas together to accomplish the dissociation of water vapor or c) to use only the chemical energy of a reducing gas to accomplish the dissociation.

A secondary benefit results from the practice of depolarization as described herein in that both the anodic and cathodic electrodes can be made of a metal such as nickel or cobalt, because the gas mixtures at both of these electrodes can be kept reducing to such metals and, as a consequence, the electrodes can be made from such relatively inexpensive, high-conductivity metals.

In a cell configuration similar to that shown in FIG. 1 employing nickel/zirconia cermet electrodes on either side of an iron-doped, yttria-stabilized zirconia electrolyte a gas containing 85 percent water vapor, the balance being hydrogen, was brought into contact with cathode 12 and at the same time hydrogen was used to depolarize the anode 16. The open circuit voltage was observed to be about —0.25 volts in contrast to an open-circuit voltage of such a cell without depolarization of about 0.9 volts.

In other experiments the same cell was employed using the same water vapor/hydrogen input to the cathode and depolarizing the anode with a methanol vapor/steam mixture, which forms a reducing gas containing CO and $H_2$ at the cell operating temperature. Once again, open circuit voltages of about —0.25 volts were observed. In each of the preceding situations, hydrogen production was shown to be coulometric. At 1,000° C., the specific resistance of the cell was found to be about 0.55 ohm-cm.$^2$, allowing attainment of current densities through the electrolyte of several amperes per square centimeter at cell voltages of about 2 volts.

Another cell having a configuration similar to that shown in FIG. 1 was provided with nickel conducting paths through the electrolyte between anode and cathode. When a water vapor/hydrogen gas mixture was admitted to the anode and the cathode was depolarized with an excess of hydrogen, about 65 percent of the water vapor was reduced at the cathode without the application of any external source of power. The current density through the electrolyte in this cell was estimated to be about 1 ampere per square centimeter.

In commercial applications of this invention as, for example, are described and claimed in U.S. Pat. application Ser. No. 742,824—Spacil filed July 5, 1968, now U.S. Pat. No. 3,556,749, and in U.S. Pat. application Ser. No. 742,699, filed July 5, 1968, the solid electrolyte cells are preferably disposed in electrical and chemical series arrangement. Such an arrangement, or cell stack, is shown in FIG. 2. The preparation of the cell stack arrangement is largely described in the aforementioned application Ser. No. 465,624—White. In the following description the recitations of materials are exemplary, of course.

Stack 30 is made by a) depositing a first electrode material (porous nickel-zirconia cermet) in separate annular segments 21 with integral nickel metal ring connector 22 along the length of a mandrel (not shown), b) depositing thereover an annular coating 23 of solid oxygen-ion electrolyte (yttria-stabilized zirconia sintered with iron oxide additive) covering the outer surface of each of the electrode segments 21 so that only one end of each segment 21 is completely covered (ring connectors 22 remaining exposed), c) depositing an outer layer of electrode material (porous nickel-zirconia cermet) in the form of annular electrode segments 24 on the electrolyte layer 23 so that at one end each top layer segment 24 contacts the exposed ring connector 22 of the adjacent first electrode segment 21 and d) removing the mandrel as, for example, by chemical etching.

The composite tube so created is then heat treated to obtain optimum densification of the stabilized zirconia electrolyte segments 23. A set of contiguous superimposed layers 21, 23, 24 constitute a single cell. In this form, the stack of cells are electrically and chemically connected in series as a self-supporting, gastight tubular structure. Any desired number of stacks 20 may be disposed in an insulated housing equipped with manifolds to enable the conduct of appropriate gases to and from the stack. Thus, in the construction in FIG. 2, electrical connections would be made to upper and lower nickel extension tubes 26 and 27, respectively. Water vapor is introduced in a downward direction through the core of stack 20, all annular electrode segments 21 being cathodic. As the water vapor proceeds downwardly it is gradually dissociated into hydrogen and oxygen and the oxygen is removed through the solid oxygen-ion electrolyte cell construction as described hereinabove to the exterior surface where the oxygen reacts with the reducing gas mixture ($CO/H_2/N_2$) and the oxygen is chemically combined therewith to produce $CO_2/H_2O/N_2$.

In effect, the chemical energy of the depolarizing species (e.g., CO and $H_2$) is being used directly to accomplish a significant portion or all of the dissociation of the water vapor.

The benefits of depolarization in accomplishing the dissociation of water vapor accrue even when the reducing species are diluted by the presence of substantial amounts of an inert gaseous diluent, as for example nitrogen. This behavior is in direct contrast to the effect of the presence of diluent using the same species (CO and $H_2$) for the generation of heat. In such case the presence of diluent gas decreases the combustion temperature and consequently decreases the energy available from the combustion process.

In a three-cell stack constructed in the manner described in connection with FIG. 2, experiments were conducted in which a) hydrogen and then b) a methanol vapor/steam mixture were used as anode depolarizers. Also, with both of these depolarizing mixtures, nitrogen was added in approximately a 2:1 ratio to simulate operation on depolarizing species obtained by partial combustion of hydrocarbons with air. No significant changes in open circuit voltage and apparent resistance of the stack were observed, because it has previously been shown that nickel/zirconia cermet anodes show essentially no mass transport overvoltages even when the anode gas contains a very large proportion of inert diluents.

The amount of unreduced water vapor present in the hydrogen effluent from core 28 of stack 20 will depend upon the particular levels of current and steam flow rate employed. If a sufficiently high current and sufficiently low flow rate are employed, it is actually possible to produce a flow of hydrogen having a dew point as low as —70° F., although such operation is not recommended on a continuous basis. In a practical construction, it would appear to be more economical to dissociate somewhat less than all of the water vapor and to trap out the excess water by cooling and adsorption in those instances in which it is desired that the hydrogen be provided dry.

The e.m.f. which must be applied to each solid electrolyte cell must be sufficient to cover the open circuit voltage needed for water vapor dissociation plus the voltage required to effect oxygen-ion transfer (ohmic voltage drop) and override the nonohmic voltage drops encountered in the cell. Stabilized zirconia electrolyte cells are preferred because of their relatively small nonohmic overvoltages.

If the oxygen or if both the hydrogen and oxygen produced in the electrolyte are of interest the reducing gas would not be introduced in order to allow oxygen gas to be concentrated at the anode. Under such conditions, however, the anode electrode material would have to be one very resistant to oxidation at high temperatures, e.g., porous praseodymium cobaltate.

In plant operation with an external power source, the space around each cell stack may be kept hot by Joulean heating of the stacks themselves, the temperature being controlled by controlling current and/or gas flow rates; for example, by balancing the Joulean heat production with sensible and conduction heat losses.

Therefore, the instant invention for the production of hydrogen by introducing a vaporization step preceding the decomposition of the water eliminates any possibility of introducing nonvaporizing impurities dissolved in the liquid feed water into the solid electrolyte cell and, in the case of the employment of a depolarization agent enables the dissociation of water vapor at a considerably reduced cost both for power consumption and for initial construction, because of the capability of employing a minimum of precious metals.

What I claim as new and desire to secure by Letters Patent of the United States is:

1. In a device for decomposing water by electrical action to generate hydrogen gas, the improvement comprising in combination:
   a. means for vaporizing water,
   b. a solid oxygen-ion electrolyte cell comprising a first electrode and a second electrode in contact with opposite faces of a layer of substantially nonporous solid oxygen-ion electrolyte material, said vaporizing means being in flow communication with said first electrode and
   c. means for supplying direct current power to said cell being connected thereto for the path of electrons to flow from said power supplying means to said first electrode and from said second electrode back to said power supplying means.

2. In a device for the decomposition of water by electrical action to generate hydrogen gas, the improvement comprising in combination:
   a. means for vaporizing water,
   b. a solid oxygen-ion electrolyte cell comprising a first electrode and a second electrode in contact with opposite faces of a layer of substantially nonporous solid oxygen-ion electrolyte material, said vaporizing means being in flow communication with said first electrode,
   c. means for supplying direct current power to said cell being connected thereto for the path of electrons to flow from said power supplying means to said first electrode and from said second electrode back to said power supplying means and
   d. a source of reducing gas, said source being in flow communication with said second electrode.

3. The improvement recited in claim 1 wherein the electrolyte of the solid electrolyte cell is stabilized zirconia.

4. The improvement recited in claim 1 wherein the electrodes are made of nickel.

* * * * *